(12) United States Patent
Hsiao et al.

(10) Patent No.: US 12,384,856 B2
(45) Date of Patent: Aug. 12, 2025

(54) COMPOSITIONS AND METHODS FOR REMOVAL OF NEGATIVELY CHARGED IMPURITIES USING METAL-CELLULOSE FIBER COMPOSITE

(71) Applicant: The Research Foundation for the State University of New York, Albany, NY (US)

(72) Inventors: Benjamin S. Hsiao, Setauket, NY (US); Sunil Sharma, East Setauket, NY (US); Priyanka R. Sharma, East Setauket, NY (US); Ken I. Johnson, Port Jefferson Station, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 373 days.

(21) Appl. No.: 17/285,543

(22) PCT Filed: Oct. 30, 2019

(86) PCT No.: PCT/US2019/058703
§ 371 (c)(1),
(2) Date: Apr. 15, 2021

(87) PCT Pub. No.: WO2020/092464
PCT Pub. Date: May 7, 2020

(65) Prior Publication Data
US 2021/0380726 A1   Dec. 9, 2021

Related U.S. Application Data

(60) Provisional application No. 62/752,465, filed on Oct. 30, 2018.

(51) Int. Cl.
    *C08B 15/04* (2006.01)
    *C02F 1/28* (2023.01)
    *C02F 101/14* (2006.01)

(52) U.S. Cl.
    CPC ............. *C08B 15/04* (2013.01); *C02F 1/288* (2013.01); *C02F 1/281* (2013.01); *C02F 1/286* (2013.01);
    (Continued)

(58) Field of Classification Search
    CPC .......... C02F 1/281; C02F 1/286; C02F 1/288; C02F 2101/14; C02F 2305/08; C08B 15/04; C08J 3/03; C08J 2301/04; C08L 1/04
    See application file for complete search history.

(56) References Cited

U.S. PATENT DOCUMENTS 6,524,348 B1 * 2/2003 Jewell ................. C08B 15/04
                                                  8/116.1
6,627,749 B1   9/2003 Kumar
(Continued)

FOREIGN PATENT DOCUMENTS

EP   1493716 A1 *  1/2005  ............ C02F 1/5245
EP   1852176 B1    7/2010
(Continued)

OTHER PUBLICATIONS

Zhang, T., Wang, W., Zhang, D., Zhang, Z., Ma, Y., Zhou, Y., Qi, L., "Biotemplated Synthesis of Gold Nanoparticle-Bacteria Cellulose Nanofiber Nanocomposites and Their Application in Biosensing", Adv. Funct. Mater. 2010, 20, 1152-1160 (Year: 2010).*
(Continued)

*Primary Examiner* — James C Goloboy
(74) *Attorney, Agent, or Firm* — Carter, DeLuca & Farrell LLP

(57) ABSTRACT

The present disclosure provides cellulose/metal composites and their use in removing impurities from liquids, including
(Continued)

water. Carboxylated nanocelluloses are combined with metal ions and the resulting composite may be contacted with a liquid, including water, to remove impurities therefrom.

18 Claims, 12 Drawing Sheets

(52) U.S. Cl.
CPC ...... *C02F 2101/14* (2013.01); *C02F 2305/08* (2013.01)

(56) References Cited

U.S. PATENT DOCUMENTS

| | | | |
|---|---|---|---|
| 6,830,695 B1* | 12/2004 | Brady | C02F 1/5236 |
| | | | 210/683 |
| 6,998,054 B2* | 2/2006 | Jangbarwala | B01D 15/362 |
| | | | 210/656 |
| 7,611,628 B1 | 11/2009 | Hinds, III | |
| 7,629,133 B2 | 12/2009 | Schlenoff | |
| 7,758,755 B2 | 7/2010 | Diallo | |
| 7,803,498 B2 | 9/2010 | Dressick | |
| 7,815,806 B2 | 10/2010 | Cooper et al. | |
| 7,988,779 B2 | 8/2011 | Disalvo et al. | |
| 8,057,901 B2 | 11/2011 | Ford et al. | |
| 8,206,822 B2 | 6/2012 | Schlenoff | |
| 8,231,013 B2 | 7/2012 | Chu et al. | |
| 8,372,891 B2 | 2/2013 | Schlenoff | |
| 8,684,187 B2 | 4/2014 | Buschmann | |
| 8,980,073 B2 | 3/2015 | Pourmand | |
| 9,481,743 B2 | 11/2016 | Ragogna | |
| 9,827,517 B2 | 11/2017 | Vecitis et al. | |
| 9,919,280 B2 | 3/2018 | Schlenoff | |
| 10,253,203 B2 | 4/2019 | Schlenoff | |
| 10,315,155 B2 | 6/2019 | Chu et al. | |
| 10,500,560 B2 | 12/2019 | Medoff | |
| 10,532,330 B2 | 1/2020 | Diallo et al. | |
| 10,556,222 B2 | 2/2020 | Grubbs et al. | |
| 10,618,013 B2 | 4/2020 | Hoek et al. | |
| 10,894,838 B2 | 1/2021 | Hsiao et al. | |
| 10,941,258 B2 | 3/2021 | Rogers | |
| 11,014,831 B2 | 5/2021 | Hartikainen | |
| 11,078,093 B2 | 8/2021 | Cwiertny et al. | |
| 11,090,616 B2 | 8/2021 | Diallo et al. | |
| 11,097,252 B2 | 8/2021 | Hummersone | |
| 11,465,101 B2 | 10/2022 | Diallo et al. | |
| 11,901,505 B2 | 2/2024 | Hu et al. | |
| 11,931,719 B2 | 3/2024 | Hummersone | |
| 12,005,040 B2 | 6/2024 | Joo et al. | |
| 12,043,675 B2 | 7/2024 | Vuorinen et al. | |
| 12,122,687 B2 | 10/2024 | Hsiao et al. | |
| 12,220,498 B2 | 2/2025 | Stewart | |
| 2007/0203335 A1 | 8/2007 | Huttermann et al. | |
| 2007/0241057 A1 | 10/2007 | Klipper et al. | |
| 2009/0297581 A1 | 12/2009 | Atanasoska et al. | |
| 2011/0014550 A1 | 1/2011 | Jiang | |
| 2011/0056887 A1 | 3/2011 | Neumann et al. | |
| 2011/0104052 A1 | 5/2011 | Barnett | |
| 2013/0180917 A1 | 7/2013 | Chu et al. | |
| 2016/0263554 A1 | 9/2016 | Grubbs et al. | |
| 2018/0009911 A1* | 1/2018 | Sone | C08B 15/04 |
| 2020/0047131 A1 | 2/2020 | Hsiao et al. | |
| 2022/0265173 A1 | 8/2022 | Zhong | |

FOREIGN PATENT DOCUMENTS

| | | | |
|---|---|---|---|
| EP | 2530200 B1 | 2/2015 | |
| EP | 2771929 B1 | 1/2017 | |
| EP | 3294674 B1 | 7/2020 | |
| JP | 7462953 B2 | 4/2024 | |
| WO | 0034033 A9 | 8/2002 | |
| WO | 2005023310 A2 | 3/2005 | |
| WO | 2005075367 A1 | 8/2005 | |
| WO | 2005115496 A1 | 12/2005 | |
| WO | 2009129410 A1 | 10/2009 | |
| WO | 2010095574 A1 | 8/2010 | |
| WO | 2012027242 A1 | 3/2012 | |
| WO | WO-2012119229 A1 * | 9/2012 | A61L 15/60 |
| WO | 2012131294 A1 | 10/2012 | |
| WO | 2014195971 A1 | 12/2014 | |
| WO | 2015084945 A1 | 6/2015 | |
| WO | 2015187412 A1 | 12/2015 | |
| WO | 2016011028 A1 | 1/2016 | |

OTHER PUBLICATIONS

International Search Report and Written Opinion of the International Searching Authority issued in corresponding application No. PCT/US2019/058703 mailed Mar. 18, 2020 (10 pages).
Extended European Search Report issued in Application No. EP 15908443.3 dated Aug. 8, 2019 (10 pages).
Madhu Kaushik, et al., "Review: nanocelluloses as versatile supports for metal nanoparticles and their applications in catalysis", The Royal Society of Chemistry, vol. 18 (2016) pp. 622-637.
Erlantz Lizundia, et al., "Metal Nanoparticles Embedded in Cellulose Nanocrystal Based Films: Material Properties and Post-use Analysis", Biomacromolecules (2018), vol. 19, pp. 2618-2628.
Rubbel Singla, et al., "Inhibition of Glycation-Induced Aggregation of Human Serum Albumin by Organic-Inorganic Hybrid Nanocomposites of Iron Oxide-Functionalized Nanocellulose", ACS Omega (2019), vol. 4, pp. 14805-14819.
Ahmed A. Oun, et al., " Multifunctional nanocellulose/metal and metal oxide nanoparticle hybrid nanomaterials", Critical Reviews in Food Science and Nutrition, 60:3, (2020) pp. 435-460.

* cited by examiner

Thermogravimetric Analysis (TGA) of Al-CNF

Figure: SEM of (A) Al-NOCF and (B) F@Al-NOCNF.

Figure: SEM of (A) Al-NOCF and (B) F@Al-NOCNF.

COMPOSITIONS AND METHODS FOR REMOVAL OF NEGATIVELY CHARGED IMPURITIES USING METAL-CELLULOSE FIBER COMPOSITE

CROSS REFERENCE TO RELATED APPLICATIONS

This application is a U.S. National Stage Application filed under 35 U.S.C. § 371 (a) of International Patent Application Serial No. PCT/US2019/058703 filed on Oct. 30, 2019, which, in turn, claims the benefit of, and priority to, U.S. Provisional Patent Application Ser. No. 62/752,465, filed Oct. 30, 2018, the entire disclosures of each of which are incorporated by reference herein.

GOVERNMENT SUPPORT

This invention was made with government support under DMR-1808690 awarded by the National Science Foundation. The government has certain rights in the invention.

BACKGROUND

The present disclosure relates to composites based upon carboxylated nanocelluloses and their use in removing negatively charged impurities from liquids, including water.

Cellulose, the major constituent of plant cell walls, is the most abundant biopolymer on earth, and thus it is a sustainable and renewable resource for energy and production of various materials. The presence of hydroxyl groups in the cellulose molecule provides a unique platform for molecular modifications to form different useful derivatives. Among these derivatives, oxidized celluloses have been used in biomedical applications due to their unique properties related to biodegradability, biocompatibility and/or bioabsorbability.

Water shortage is a global concern of growing population. Worldwide, over 7% of total population lacks access to clean drinking water due to contamination, including high fluoride contamination.

Improved methods for treating water remain desirable.

SUMMARY

The present disclosure provides cellulose/metal composites and their use in removing impurities from liquids, including water. In embodiments, a composite of the present disclosure includes carboxylated cellulose nanofibers and positively charged metal ions, wherein ionic interactions between the cellulose chains and the positively charged metal ions form the composite.

In some embodiments, the ionic interactions occur between oxygen atoms of a hydroxyl group, a carboxylate group, or both, on the carboxylated cellulose and the positively charged metal ions.

In embodiments the composite is a gel.

The cellulose nanofibers may be obtained from a plant biomass. The plant biomass may include lignocellulose wood, non-lignocellulose wood, lignocellulose, pure cellulose, grasses, phytoplanktons, algal celluloses, tunicate celluloses, and combinations thereof. In some embodiments, the plant biomass is obtained from non-wood sources selected from jute, bamboo, cotton, banana rachis, wheat straw, barley, hemp, flax straw, coconut fiber, soy hull, pea hull fiber, rice husk, sugarcane bagasse, pineapple leaf rachis, sisal fiber, tunicates, black spruce, eucalyptus, valonia, bacterial celluloses, spinifex, and combinations thereof.

In embodiments, the positive metal ions may be selected from aluminum, copper, zinc, iron, titanium, gold, silver, palladium, platinum, and combinations thereof. In some embodiments, the positive metal ions are selected from $Al3+$, $Cu2+$, $Zn2+$, $Fe3+$, $Ti+$, $Au3+$, $Ag+$, $Pd2+$, $Pt4+$, and combinations thereof.

The composite has a charge density from about 0.01 mmol/g to about 10 mmol/g.

The present disclosure also provides for the use of the composite to remove negatively charged impurities from a liquid, in embodiments water.

Negatively charged impurities which may be removed from a liquid with a composite of the present disclosure include halogenated ions such as F—, as well as NO2—, NO3—, PO42—, SO42—, CN—, AsO3—, phenoxide, and combinations of the foregoing.

The present disclosure also provides methods for using the composites of the present disclosure to remove negatively charged impurities from a liquid. In embodiments, a method of the present disclosure includes contacting at least one carboxylated cellulose nanofiber with at least one positively charged metal ion to generate a composite, and contacting the composite with a liquid to remove negatively charged impurities from the liquid.

BRIEF DESCRIPTION OF THE DRAWINGS

The accompanying drawings, which are included to provide further understanding of the subject technology and are incorporated in and constitute a part of this specification, illustrate aspects of the disclosure and together with the description serve to explain the principles of the subject technology.

DETAILED DESCRIPTION

Figure 1:
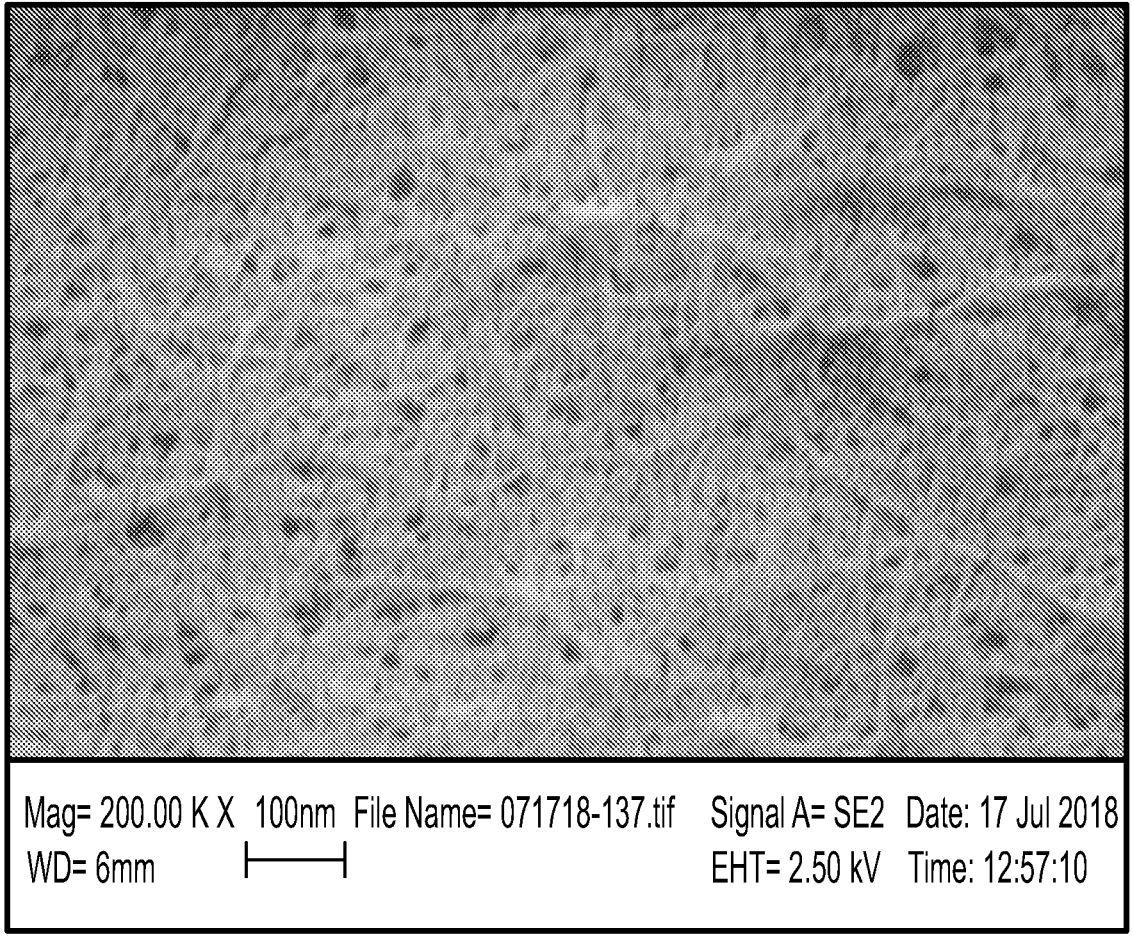
FIG. 1 is a scanning electron microscopy image of an Al—NOCNF composite of the present disclosure.

The following detailed description of embodiments of the disclosure will be made in reference to the accompanying drawings. Explanation about related functions or constructions known in the art are omitted for the sake of clearness in understanding the concept of the disclosure to avoid obscuring the disclosure with unnecessary detail.

Embodiments of the disclosure described herein provide compositions and methods for removal of negatively charged impurities using a metal-cellulose fiber composite of the present disclosure. In embodiments the disclosure demonstrates a new way to remove high concentration ions, such as fluoride, from water using renewable and sustainable nanocellulose materials. Cellulose macrofibers and nanofibers used in in the compositions and methods are negatively charged and prepared by methods within the purview of a person of ordinary skill in the art, including TEMPO oxidation, nitro-oxidation, combinations thereof, and the like.

Cellulose nanofibers for use in accordance with the present disclosure may be obtained from any and all raw biomasses, such as lignocellulosic wood or non-wood sources including, but not limited to, jute, bamboo, cotton, banana rachis, wheat straw, barley, hemp, flax straw, coconut fiber, soy hull, pea hull fiber, rice husk, sugarcane bagasse, pineapple leaf rachis, sisal fiber, tunicates, black spruce, eucalyptus, valonia, bacterial celluloses, phytoplanktons, algal celluloses, tunicate celluloses, grasses including spinifex grasses, and combinations thereof.

The direct use of biomass from lignocellulose wood or non-wood sources, without the need for conventional extraction/pretreatment steps, can immediately reduce the consumption of many potentially toxic chemicals, in some cases by as much as 50-60%.

In embodiments, oxidized cellulose nanofibers for use in forming a composite of the present disclosure are prepared by a TEMPO-mediated oxidation method. TEMPO (2,2,6,6-tetramethylpiperidine-1-oxylradical)-mediated oxidation defibrillates chemically treated and processed forms of biomass. In the TEMPO method, the raw material (biomass) is pretreated to extract cellulose therefrom. Methods for pretreatment include, for example, steam explosion, whereby the biomass is treated at a pressure of approximately 140 Pascal, and a temperature from about 200-250° C.; an ammonia explosion method, where the biomass is treated with ammonia under high pressure; or a chemical treatment method, which includes treating the biomass with sodium hydroxide, peroxides, sodium borate, nitric acid, and dimethylsulfoxide. The extracted cellulose is then bleached by treatment with sodium chlorite or a combination of hydrogen peroxide with sodium chlorite while boiling.

Once the pretreatment step has concluded, TEMPO and NaBr (sodium bromide) are added to the cellulose suspension, which is kept at a pH of 10-11 by adding NaOH (sodium hydroxide). The primary oxidant NaClO (sodium hypochlorite) is subsequently added, and it is reduced to NaCl (sodium chloride) in this step. The NaBr is oxidized to NaBrO (sodium hypobromite), but NaBrO is subsequently reduced to form NaBr, forming a cyclic system. The TEMPO radical works in a similar manner, being oxidized and then reduced in order to oxidize the glucose monomers, converting the primary hydroxyl groups to carboxylates via an intermediate step involving the formation of aldehydes.

In other embodiments, oxidized cellulose nanofibers for use in forming a composite of the present disclosure are prepared using an acid component and an oxidizing agent, sometimes referred to, in embodiments, as nitro-oxidation. The general process for nitro-oxidation is described in U.S. Patent Application Publication No. 2018/0086851, the entire disclosure of which is incorporated by reference herein. Briefly, the acid component includes nitric acid ($HNO_3$). Nitric acid may be used by itself as the acid component, or may be combined with an additional acid. Suitable additional acids which may be used with nitric acid as the acid component include, in embodiments, hydrochloric acid (HCl), sulfuric acid ($H_2SO_4$), acetic acid ($CH_3COOH$), hydrobromic acid (HBr), hydrofluoric acid (HF) and combinations thereof. The acid component, which may be nitric acid or a combination of nitric acid with one of the other foregoing acids, may be at a concentration from about 10 mmol to about 300 mmol, in embodiments from about 20 mmol to about 250 mmol.

Suitable oxidizing agents for use in the nitro-oxidation process include, in embodiments, nitrite salts, nitrate salts, and combinations thereof. Suitable nitrite salts and nitrate salts include, for example, sodium nitrite ($NaNO_2$), potassium nitrite ($KNO_2$), calcium nitrite ($Ca(NO_2)_2$), magnesium nitrite ($Mg(NO_2)_2$), lithium nitrite ($LiNO_2$), ammonium nitrite ($NH_4NO_2$), nitrite esters, sodium nitrate ($NaNO_3$), potassium nitrate ($KNO_3$), calcium nitrate ($Ca(NO_3)_2$), magnesium nitrate ($Mg(NO_3)_2$), lithium nitrate ($LiNO_3$), ammonium nitrate ($NH_4NO_3$), nitrate esters, and/or combinations of these nitrite salts and nitrate salts. The oxidizing agent may be at a concentration from about 0.1 mmol to about 60 mmol, in embodiments from about 10 mmol to about 30 mmol.

In accordance with the present disclosure, the plant biomass is chopped or otherwise reduced in size in the nitro-oxidation process and then treated with an acid component as described above to wet the plant biomass. In some embodiments, the plant biomass may be washed with acetone, water, sodium hydroxide, potassium hydroxide, ethyl acetate, ethanol, and combinations thereof, prior to addition of the acid. The oxidizing agent(s), such as a nitrite salt described above, is then added thereto, and the materials are held at a temperature from about 25° C. to about 100° C., in embodiments from about 40° C. to about 60° C.

The process can be completed in a short time period, in embodiments from about 30 minutes to about 72 hours, in other embodiments from about 3 hours to about 12 hours, without the aid of mechanical treatments.

After the reaction of acid component and oxidizing agent is complete in the nitro-oxidation process, the resulting carboxy or carboxylated nanocelluloses may be collected by means within the purview of those skilled in the art, including, for example, decantation, centrifugation and/or dialysis.

While the above disclosure has focused on the use of TEMPO oxidation or nitro-oxidation to modify primary and secondary hydroxyl groups on the cellulose to form negatively charged groups such as carboxylate groups (COO—), it is to be appreciated by the skilled artisan that other methods, such as per-iodate oxidation, perchlorite oxidation, carboxymethylation, etc., may be used to form the carboxylated cellulose fibers used in forming the composite structure of the present disclosure.

The above methods for forming the carboxylated cellulose results in the production of microfibers and/or nanofibers. In embodiments, the fibers combine to form a cellulose fibrous scaffold. While the methods of the present disclosure do not require the use of mechanical steps, in some embodiments, however, additional mechanical treatments may be used with the methods of the present disclosure to convert cellulose microfibers into nanofibers (length L=>100 nm and diameter D=<100 nm). Such methods include, for example, sonication, homogenization, cryo-crushing, grinding, steam explosion, ball-milling, microfluidization, combined chemical and mechanical treatments, and combinations of the foregoing.

Sonication is a method within the purview of those skilled in the art and includes the use of sound wave energy to break up materials. Commercially available sonicators are available for purchase, and include those sold by Misonix. Times and conditions for sonication may be determined following the manufacturer's directions.

Homogenization is a method within the purview of those skilled in the art. Commercially available homogenizers are available for purchase, and include those sold by APV and/or Gaulin. Homogenization includes shearing, impact and cavitation forces to break up materials. The pressures applied can be about 1000 bar, for example. Times and conditions for sonication may be determined following the manufacturer's directions.

Cryo-crushing is a method within the purview of those skilled in the art and includes the use of a cryogenic liquid, such as liquid nitrogen, to cool materials (down to temperatures as low as −196° C.) to the point they become brittle, thereby facilitating their mechanical reduction. Times and conditions for cryo-crushing may be determined following the manufacturer's directions.

Steam explosion is a violent boiling or flashing of water into steam, occurring when water is either superheated, or rapidly heated by fine hot debris introduced therein. In general, steam explosion is a process in which biomass can be treated with hot steam (180° C. to 240° C.) under pressure (1 to 3.5 MPa) followed by an explosive decompression of the biomass that results in a rupture of the rigid structure of the biomass fibers.

Where optional extra mechanical treatments such as sonication, homogenization, cryo-crushing, and the like are used, the completion time for the reaction can be substantially shortened, in embodiments to from about 1 minute to about 6 hours, in other embodiments from about 5 minutes to about 1 hour.

Once obtained, the carboxylated cellulose fibers in micro or nano forms possess negative charges. The carboxylated cellulose fibers are then treated with solution(s) of metal ions having high positive charges (e.g., above the monovalent charge) at room temperature. Without wishing to be bound by any theory, it is believed the ionic interactions between the oxygen atoms of the hydroxyl and/or carboxylate groups on the cellulose chains and the positively charged metal ions generate a stable composite structure (e.g. gel) of the carboxylated cellulose with the metal ions.

Suitable metals which may be used in forming the composite of the present disclosure include, for example, aluminum, copper, zinc, iron, titanium, gold, silver, palladium, platinum, manganese, combinations thereof, and the like. In embodiments, as noted above, the metals are in ionic form, such as $Al^{3+}$, $Cu^{2+}$, $Zn^{2+}$, $Fe^{3+}$, $Ti^+$, $Au^{3+}$, $Ag^+$, $Pd^{2+}$, $Pt^{4+}$, combinations thereof, and the like.

As noted above, the metal is placed in a suitable solvent to form a solution of the metal ions. Suitable solvents include, for example, water, aqueous alkali, aqueous acid, combinations thereof, and the like. The metal may be present in the resulting solution in an amount from about 0.001 ppm to about 10000 ppm, in embodiments from about 0.01 ppm to about 5000 ppm, in some other embodiments from about 0.01 ppm to about 1000 ppm. The solution with the metal ions may be applied to the carboxylated cellulose fibers by any means within the purview of those skilled in the art including, for example, dipping, spraying, solution casting, combinations thereof, and the like.

The resulting composite carries a charge density from about 0.01 mmol/g to about 10 mmol/g, in embodiments from about 0.1 mmol/g to about 7.5 mmol/g, in embodiments from about 0.5 mmol/g to about 5 mmol/g, whereby the loading of metal ions varies from about 1% by weight to about 70% by weight of the composite, in embodiments from about 5% by weight to about 60% by weight the composite, in embodiments from about 10% by weight to about 50% by weight of the composite.

The resulting composite with strong residual positive charges may then be utilized to effectively remove any negatively charged impurities (e.g., $X^-$ (halogenated ions, such as $F^-$), $NO_2^-$, $NO_3^-$, $PO_4^{3-}$, $SO_4^{2-}$, $CN^-$, $AsO_3$, phenoxide, combinations thereof, etc.) from liquids, including water. Importantly, the composite of carboxylated cellulose fibers and positive metal ions can be easily separated along with the negatively charged impurities after remediation, without the problem of secondary contamination.

The resulting composite materials are efficient in microfiltration, ultrafiltration, and/or nanofiltration for water purification applications and have the potential to be implemented in developing countries because of the low cost and availability of cellulose.

Embodiments of the disclosure described herein provide the following advantages:

1. Use of Sustainable and Cost-Effective Cellulose Microfibers and Nanofibers

Cellulose fibers are a sustainable, renewable and biodegradable material, which can act as a good adsorbent/absorbent when properly functionalized. The appropriate modification schemes to functionalize cellulose fibers in the form of microfibers or nanofibers provides effective media for removal of charged contaminants such as fluoride ions.

Both untreated/treated biomass can be used to generate cellulose microfibers and nanofibers.

Cellulose macrofibers/nanofibers are converted and used to form a negatively charged substrate by using the nitro-oxidation, TEMPO oxidation, carboxymethylation, or similar methods.

These cellulose fibers possess anhydroglucose units whereby the secondary and primary hydroxyl group can be functionalized into negatively charged groups, (such as $COO^-$, etc.)

The negatively charged cellulose macrofibers/nanofibers electrostatically bind with metal ions having strong electropositive charge, such as $Al^{3+}$, $Cu^{2+}$, $Zn^{2+}$ and $Fe^{3+}$.

The cellulose/metal ion interactions results in the generation of a composite in the form of stable gel in water, where the process is simple and cost-effective.

The resulting composite may be used to remove a wide range of negatively charged contaminants, such as F.

2. Aluminum-Cellulose Nanofibers (Al—NOCNF) to Remove Fluoride Ions at a Wide Range of Concentrations:

A wide range of fluoride ions (1.25-125 ppm) could be removed using a small concentration of Al—NOCNF gel (0.05-1 wt. %).

3. Efficiency:

The preliminary results showed the AL-NOCNF composite had the adsorption capacity of 38 mg fluoride per gram of Al—NOCNF at a low fluoride concentration of 1000 ppm even under a short contact time (5 min) at the neutral conditions (pH=7).

4. Zero Toxicity:

The nitro-oxidized cellulose (e.g. CNF) used in this process is biodegradable, abundant, sustainable, and biocompatible because it could be extracted from untreated/raw/waste plant biomass.

5. Diverse Applications of AL-NOCNF as a Water Purification Agent:

The Al—NOCNF composite can be used as a flocculent/coagulant/adsorbent/filter/membrane material to remove fluoride ions from water.

6. Expeditious Process:

The remediation process using the carboxylated cellulose nanofibers and aluminum ion is fast, completed in <5 minutes.

7. No Secondary Contamination:

The use of Al—NOCNF composite to purify contaminated water does not introduce secondary contaminants after the remediation process, which is a common problem among synthetic adsorbents.

8. Recycling of Al—NOCNF:

The Al—NOCNF will naturally settle in solutions of water (less than one hour), can be separated from solution, washed, and then reused. Other adsorbents can be very difficult to separate from solution and may cost too much energy.

The following Examples are being submitted to illustrate embodiments of the present disclosure. The Examples are intended to be illustrative only and are not intended to limit the scope of the present disclosure. Also, parts and percentages are by weight unless otherwise indicated. As used herein, "room temperature" refers to a temperature of from about 20° C. to about 30° C.

Example 1

Preparation of CNF Scaffold

Cellulose nanofibers (CNF) were carboxylated using the nitro-oxidation method. Briefly, the method of preparation of carboxylated cellulose nanofibers using nitro-oxidation method involved the following. 10 grams of finely cut dried jute fibers were placed in a 1 L three-neck round bottom flask, where 14 mL (22.2 mmol) of nitric acid (60%) was subsequently added. When the samples became completely soaked in the acid, 0.96 grams of sodium nitrite (14 mmol) was added to the reaction mixture under continuous stirring. Upon the addition of sodium nitrite, red fumes were formed inside the flask. To prevent the red fumes from escaping, the mouths of the round bottom flask were closed with stoppers. The reaction was performed at 50° C. for 12 hours and was then quenched by adding 250 mL of distilled water to the beaker. Once the final product equilibrated, the supernatant liquid was discarded to remove the excess acid, leaving behind the solid product. After performing a first decantation process, a mixture of ethanol and water (1:2 ratio) was added to the solid product and then the suspension was stirred using a glass rod. The sample was untouched until the liquid (supernatant) and solid appeared as a separate layer.

The supernatant was then decanted off, leaving behind the solid product. The above decantation step was repeated 4-5 times, until the pH value of the product suspension reached above 2.5. The fibers suspension was then transferred to a dialysis bag (Spectral/Por, MWCO: 6-8 kDa) and equilibrated for 4-5 days until the conductivity of water reached below 5 µS. The resulting nanofibers possessed the carboxyl (COOH) functionality.

To obtain a good dispersion with ionic properties (COO$^-$ Na$^+$), the fibers were then treated with 8 wt % sodium bicarbonates (1:10 wt/v %), until the pH of suspension reached 7.5. The sample was again dialyzed (using a dialysis bag, Spectral/Por, with MWCO: 6-8 kDa) and equilibrated for 2-4 days, till the conductivity of water reached below 5 µS. The slurry of fibers (0.2 wt %) was then homogenized using a high pressure homogenizer (GEA Niro Soavi Panda Plus Bench top homogenizer), at 250 bar for 1 cycle.)

Example 2

About 100 grams of 0.294 wt. % suspension of the resulting cellulose nanofibers from Example 1 were then added into a 250 mL beaker under vigorous stirring using a one inch Teflon coated stir bar. One part of aluminum ion was added per one part of glucose unit of CNF to obtain an excess of aluminum using the following equations I, II, and III.

$$0.294 \text{ wt. } \% \div 100\% = \frac{0.00294 \text{ g NOCNF}}{\text{g suspension}} \quad (I)$$

$$0.00294 \text{ g NOCNF} \times 100 \text{ g NOCNF} \times \frac{\text{mol glucose unit}}{162 \text{ g glucose unit}} = \quad (II)$$
$$0.00363 \text{ mols glucose units}$$

$$0.00363 \text{ mols Al} \times \frac{L}{1.00 \text{ mols Al}} \times \frac{1000 \text{ } \mu L}{L} = \quad (III)$$
$$3630 \text{ } \mu L \text{ of Al solution}$$

Using a 1.00 molar solution of aluminum ions, 3630 µL of the solution was added dropwise to the NOCNF. The aluminum ion solution was prepared using aluminum sulfate (97+% from Alfa Aesar). Because the aluminum sulfate was hydrated, the molecular weight was approximated to be 630.39 grams per mol. Calculations are set forth below in equation (IV).

$$\frac{1.00 \text{ mol Al}}{L} \times 0.050 \text{ L} \times \frac{1 \text{ mol Al}_2(SO_4)_3}{2 \text{ mol Al}} \times \quad (IV)$$
$$\frac{630.39 \text{ grams}}{\text{mol Al}_2(SO_4)_3} \div 0.97 = 16. \text{ grams Al}_2(SO_4)_3$$

After adding approximately half of the aluminum solution, a semisolid gel formed. Stirring was maintained to breakdown the gel to allow for continual addition of aluminum solution.

After adding all the aluminum solution, the suspension was then stirred for an additional 3.0 hours. After three hours, the suspension was then centrifuged, decanted, and distilled water was replaced. This procedure was repeated several times until the Al—NOCNF (aluminum-cellulose nanofibers) suspension maintained a conductivity below 10 µS. This generally required 9-11 washes.

After washing, the sample was stored in water at a temperature of 2-4° C. The resulting composite was semisolid in appearance, i.e., a gel, and was very stable in water and would not degrade and generate toxic Al nanoparticles, which were all bound tightly within the CNF scaffold. In other words, the CNF bound all charged aluminum nanoparticles.

FIG. 1 shows a typical scanning electron microscopy image of the Al—NOCNF composite. The SEM showed the Al—NOCNF maintained the nanostructured morphology found in pure NOCNF. Fiber length varied from several hundred nanometers and width of 5-10 nm. The image clearly demonstrated the presence of fibers coated with metal particles. White dots on the fibers were due to the presence of aluminum metal nanoparticles on the surface.

Figure 2:
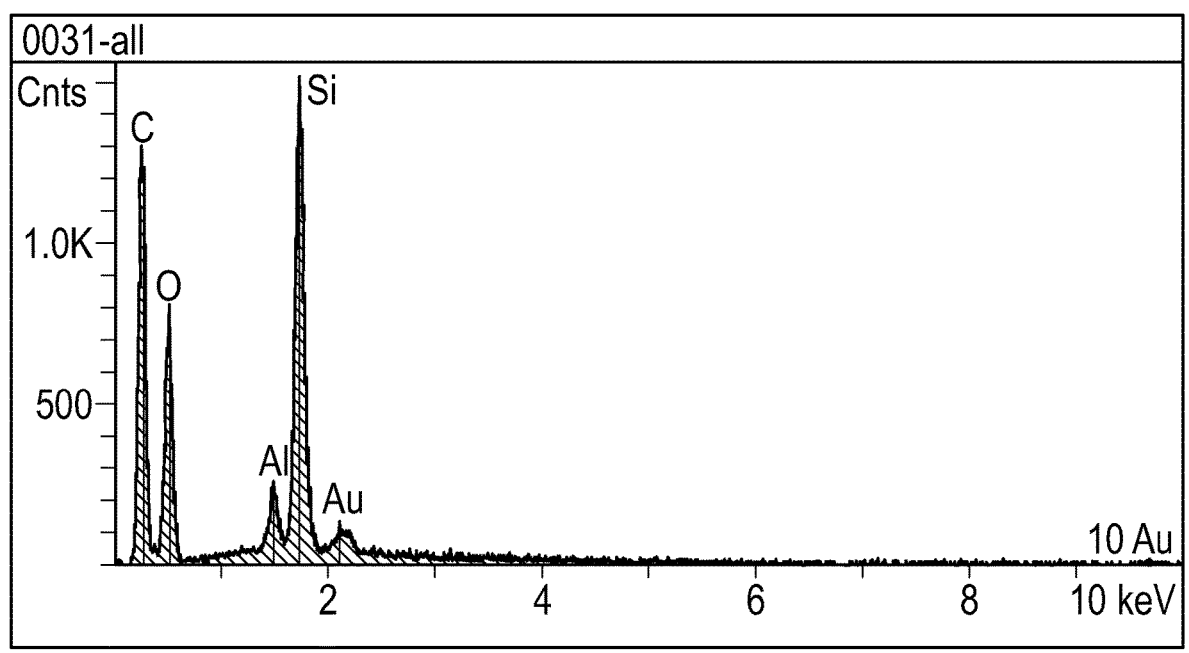
FIG. 2 is an Energy-dispersive X-ray spectroscopy (EDS) image of an Al—NOCNF composite of the present disclosure.

The presence of aluminum nanoparticles on the fibers was further confirmed by its corresponding EDS (Energy-dispersive X-ray spectroscopy) image (see, FIG. 2). The EDS indicated that aluminum was present, but there was no presence of sulfur. This indicated the aluminum was exchanging with some sodium, and the sodium sulfate existed as a free salt in solution. The graph of the EDS spectra shows the peaks of Carbon (C), Oxygen (O), indicating the composition of cellulose fibers (CNF); Si (silica) peak, as Al—NOCNF drop casted on silicon wafer; and the peak showing Al (aluminum) depicted the presence of aluminum along with cellulose nanofibers.

The data of SEM and EDS confirmed that the aluminum nanoparticles covered the surface of cellulose fibers. The nanoparticles probably included some forms of aluminum hydroxide.

Figure 3:
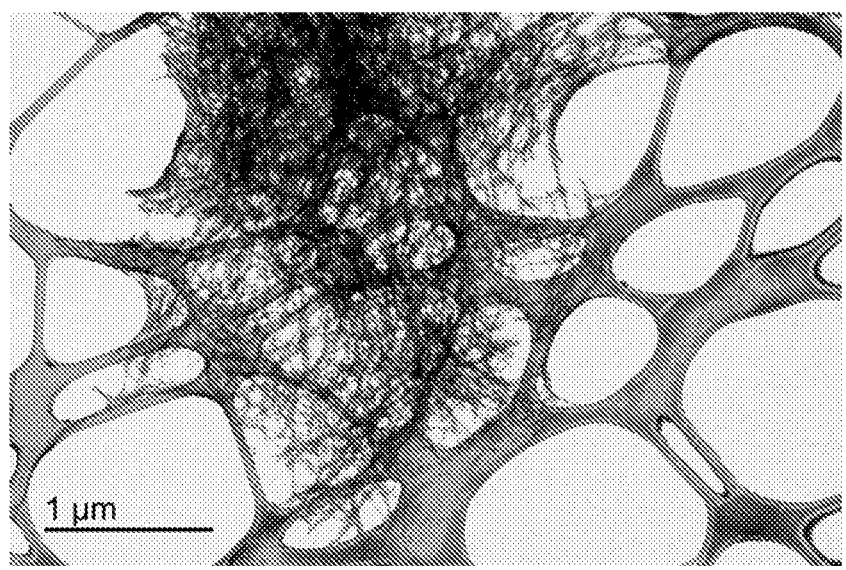
FIG. 3 a transmission electron microscopy (TEM) image of an Al—NOCNF composite of the present disclosure.

FIG. 3 is a transmission electron microscopy (TEM) image of the Al—NOCNF composite. Clusters of fibers were seen in the TEM image, indicating the non-dispersed nature of NOCNF when combined with Al metal ions. The image was taken at low magnification (1 μm scale), hence the edges of copper grid used to cast the sample also appeared in the image. The image was taken without staining the sample using uranyl acetate. Hence, the dark fine fibers depicts the presence of metal ions on its surface.

Figure 4:
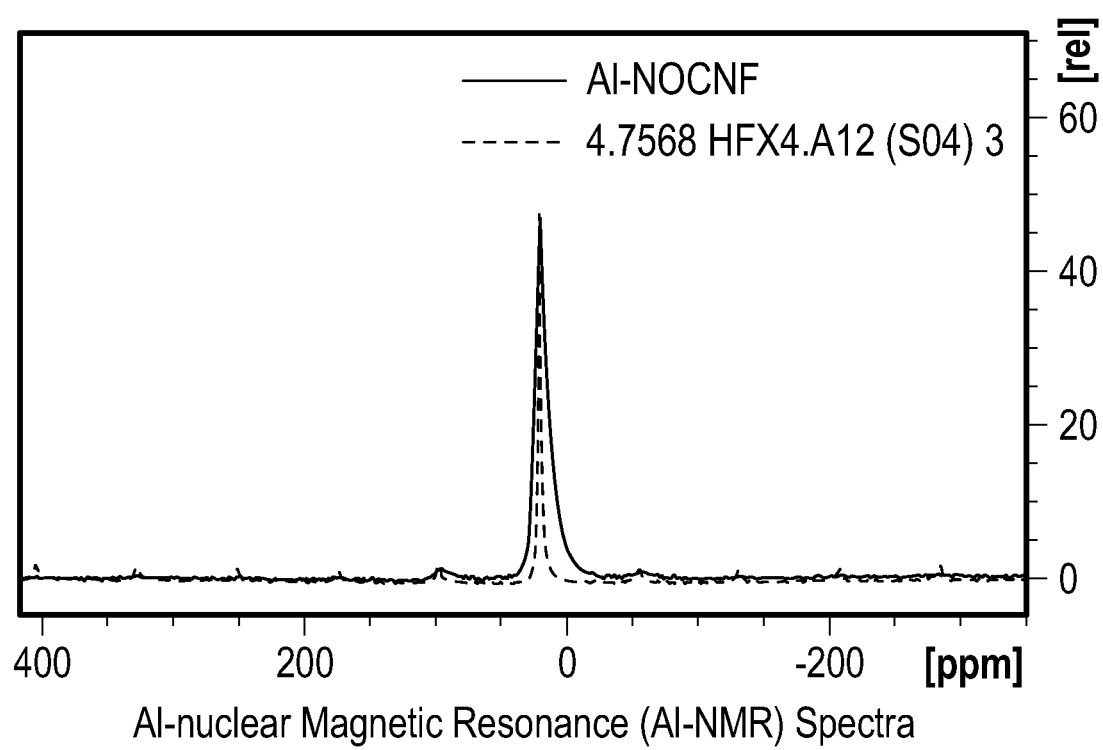
FIG. 4 is a solid state Al-NMR spectra of an Al—NOCNF composite of the present disclosure.

Solid state Al-NMR was performed to further confirm the presence of Al in the NOCNF. The spectra that was obtained is presented as FIG. 4. The presence of sharp peak at 20-24 ppm in NMR spectra belongs to aluminum peak.

Figure 5:
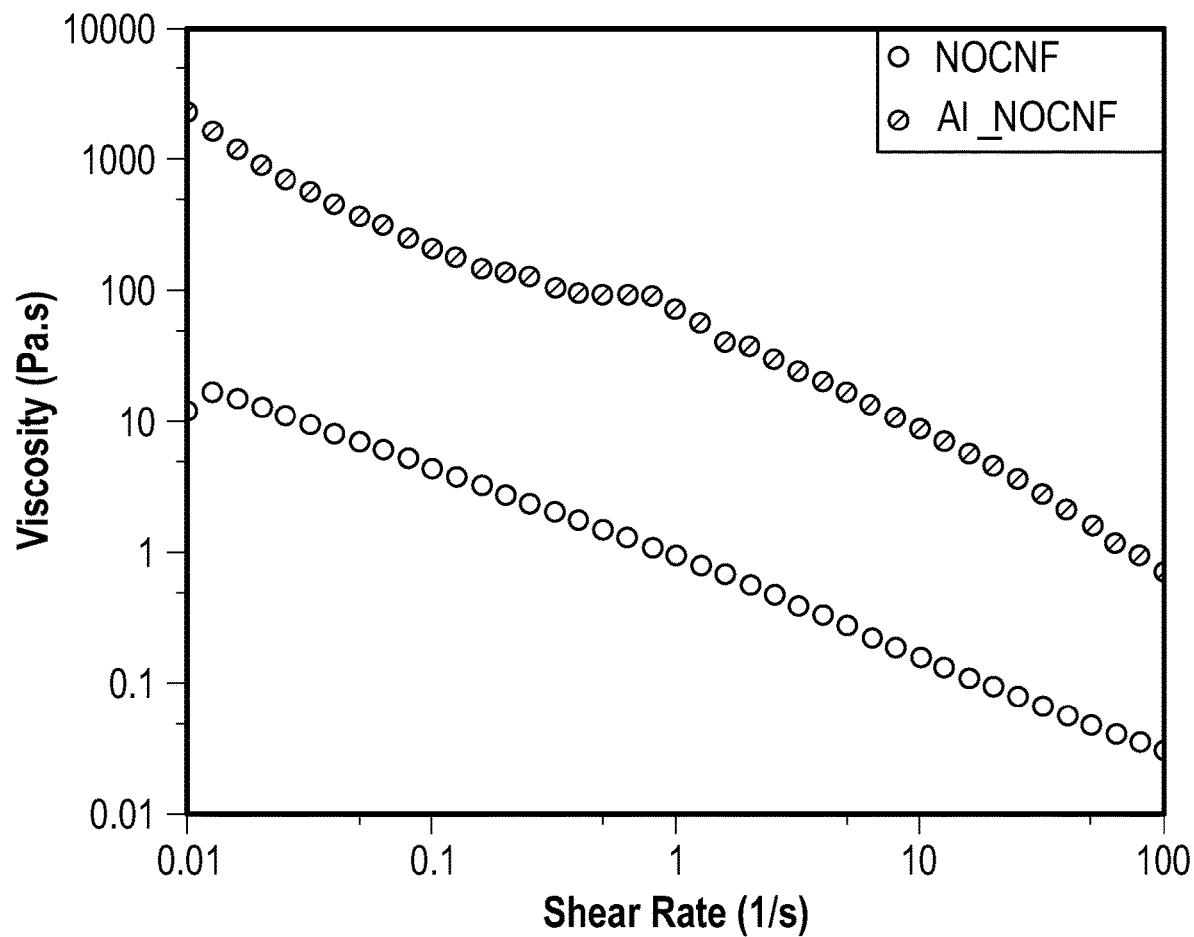
FIG. 5 is a graph depicting results of a UV-vis adsorption study of an Al—NOCNF composite of the present disclosure.

A UV adsorption study was conducted on cellulose nanofibers (NOCNF) and aluminum loaded cellulose nanofibers (Al—NOCNF). The resulting spectra is set forth as FIG. 5. The UV-Vis (determined by UV-vis spectroscopy at 200-1000 nm) of Al—NOCNF showed a % transmittance of 5%, indicating less light passed through the Al—NOCNF film, as a result of crosslinking with aluminum. The Contact for Al—NOCNF was greater, indicating greater relative hydrophobicity, as a result of strongly occupying the hydrophilic carboxylic acids groups on cellulose. Lastly, the Al—NOCNF showed a higher viscosity, a result of aluminum crosslinking.

Figure 6:
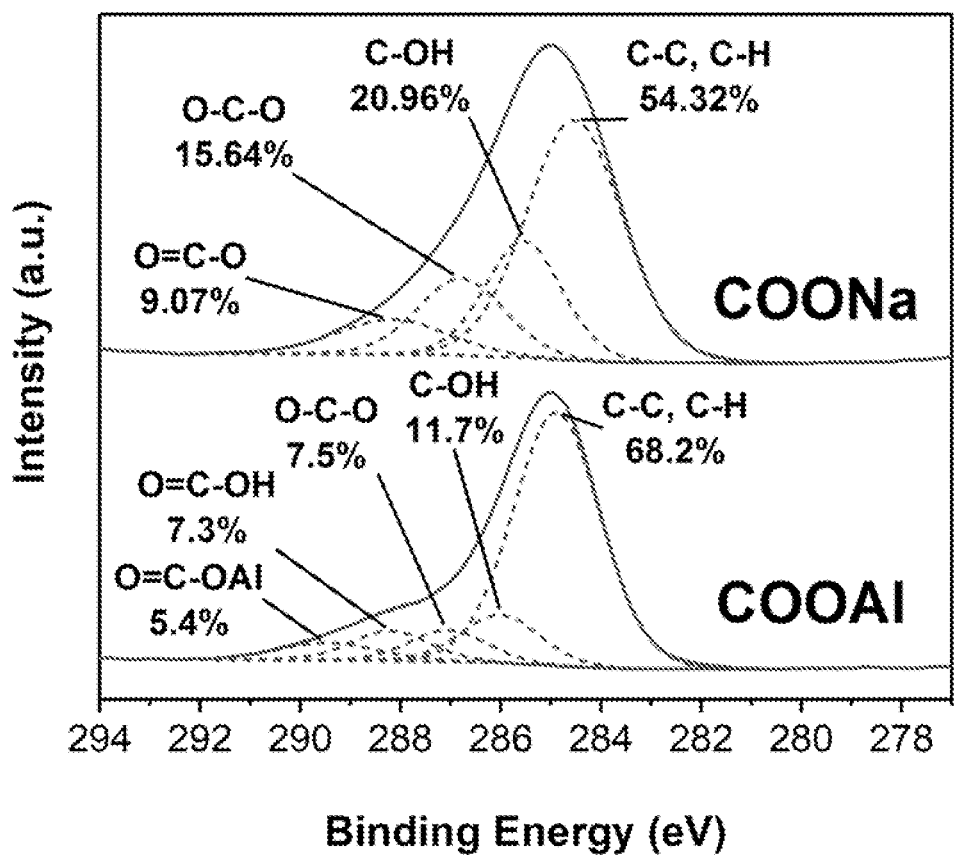
FIG. 6 is an X-ray photoelectron spectroscopic (XPS) spectra for cellulose nanofibers (NOCNF—COONa) and aluminum loaded cellulose nanofibers, i.e., the Al—NOCNF composite (Al—NOCNF/COOAl) of the present disclosure.

X-ray photoelectron spectroscopic (XPS) data was obtained for cellulose nanofibers (NOCNF—COONa) and aluminum loaded cellulose nanofibers (Al—NOCNF/COOAl). The spectra obtained is set forth as FIG. 6. The C1s peak of COONa can be deconvoluted into four smaller peaks. Fitting was done using a Shirley background, Gaussian curve fitting, and constraining both peak position and FWHM. From greatest to lowest relative area, the C—C, C—H peak corresponded to the cellulose backbone ring and hydrocarbon bonding. The C—OH was attributed to carbon bonding with alcohol groups in cellulose. The O—C—O peak came from the acetal group. The O=C— peak was a result of the carboxyl groups. From the COOAl peak, an additional peak from O=C—OAl interaction was observed.

Figure 7:
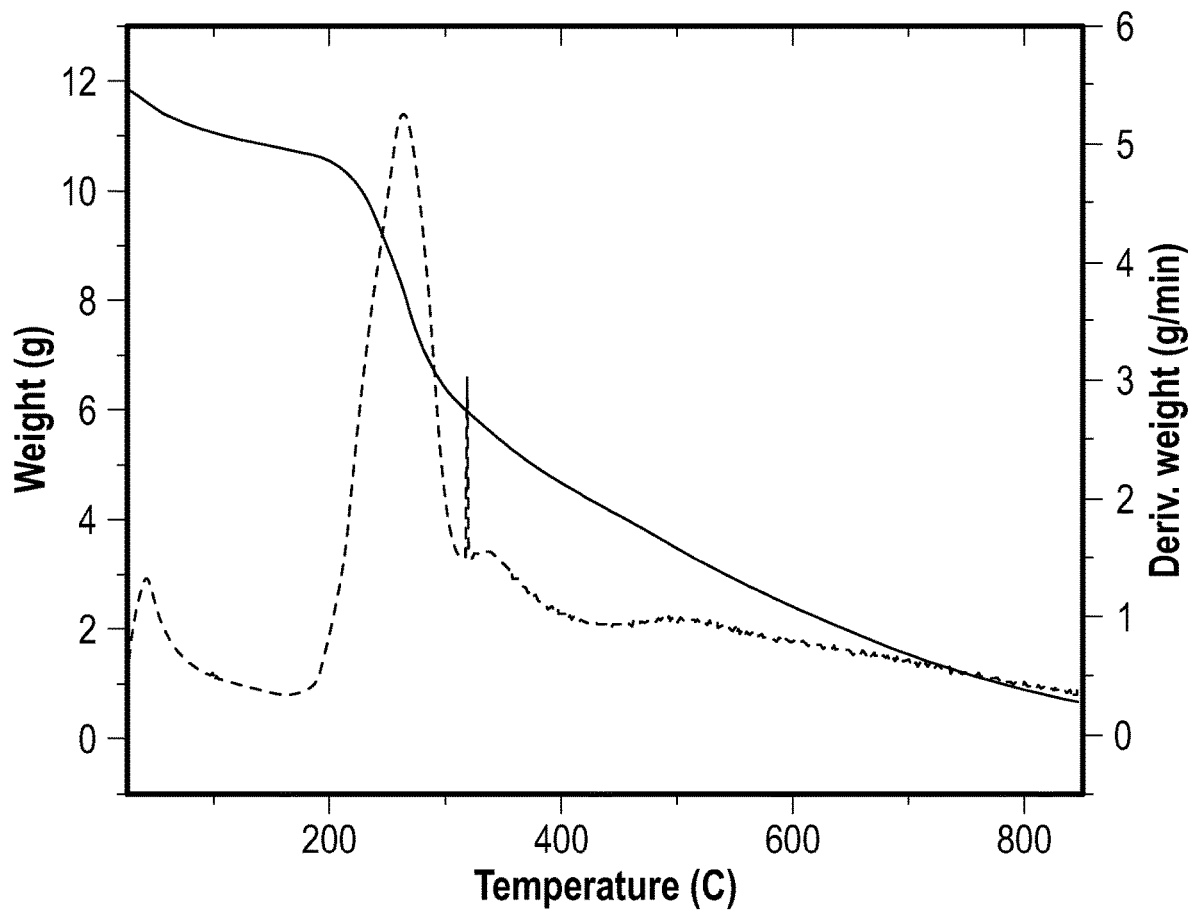
FIG. 7 is a graph depicting the results of thermogravimetric analysis and derivative thermogravimetric analysis of an Al—NOCNF composite of the present disclosure.

FIG. 7 represents the results of the thermogravimetric analysis and derivative thermogravimetric analysis of the Al—NOCNF composite. The solid line TGA curve in FIG. 7 indicates that the onset degradation temperature of Al—NOCNF lied approximately at 200° C., however no sharp degradation occurred at offset degradation temperature. The weight loss happened at 800° C. was only 84 wt %, indicating that there was approximately 16% aluminum loading in Al—NOCNF composite.

The maximum degradation temperature of Al—NOCNF was measured by derivative thermogravimetric analysis, shown by the dashed line curve in FIG. 7. It demonstrates that the maximum degradation of Al—NOCNF occurred at 240° C. and a small portion of composite degraded at 320° C., which might be corresponding to aluminum and cellulose moiety respectively.

Adsorption data showing fluoride adsorption/capture on the Al—NOCNF were obtained using Inductively coupled plasma mass spectrometry (ICI'-MS) to measure concentration of aluminum. The adsorption capacity of fluoride removal using the Al—NOCNF composite was carried out at different fluoride concentration (5 pm to 2500 pm). A certain amount of composite was treated with different concentration of fluoride and the supernatant after remediation experiment was taken out and the amount was measured using the fluoride ion probe.

Figure 8:
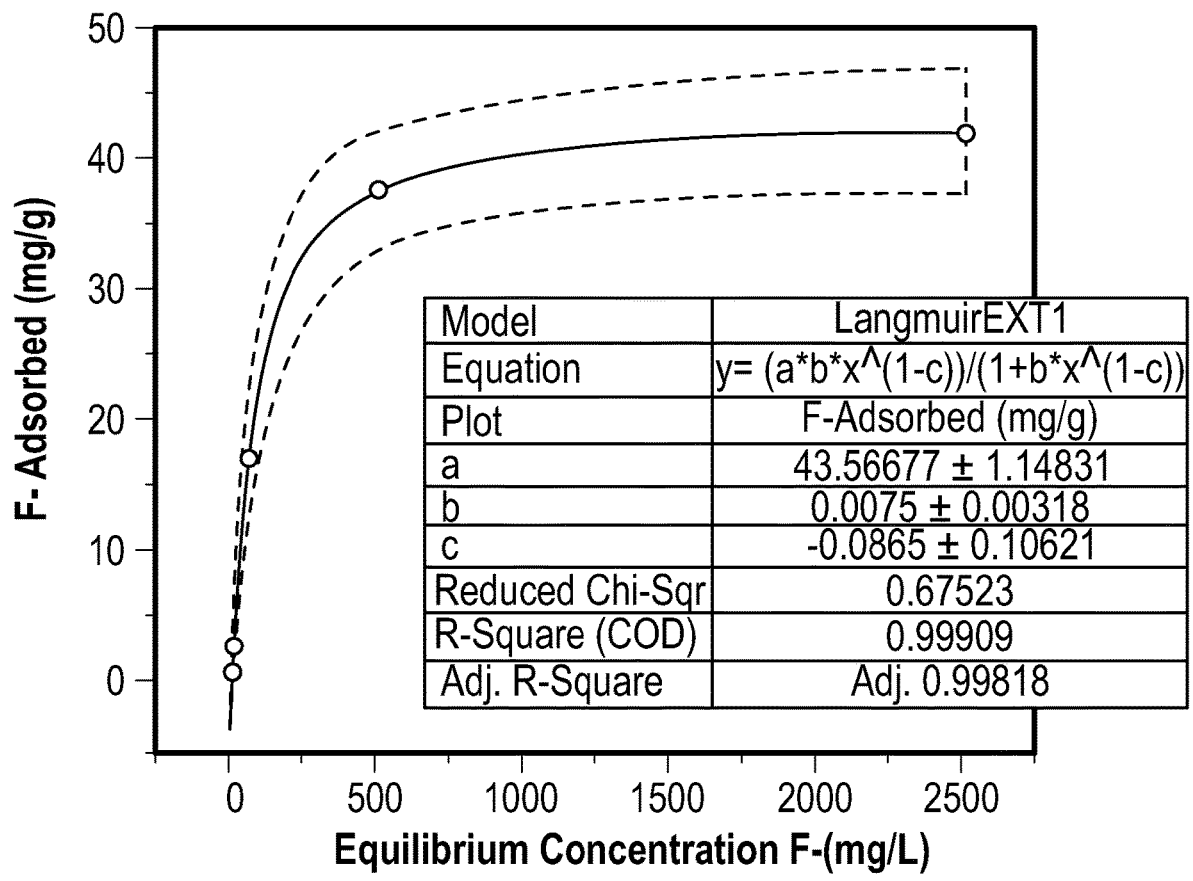
FIG. 8 is a graph depicting the adsorption capacity of the Al—NOCNF composite of the present disclosure.

A widely used Langmuir model, which was representative of monolayer adsorption occurring on an energetically uniform surface without interactive molecules, was found to fit the process successfully (FIG. 8). The Langmuir model (equation (V)) is given below.

$$y=(a*b*x\hat{}(1-c))/(1+b*x\hat{}(1-c)) \quad (V)$$

The data obtained from the measurement of ion probe was then plotted using the Langmuir isotherm model. The results are depicted in FIG. 8.

Figure 9:
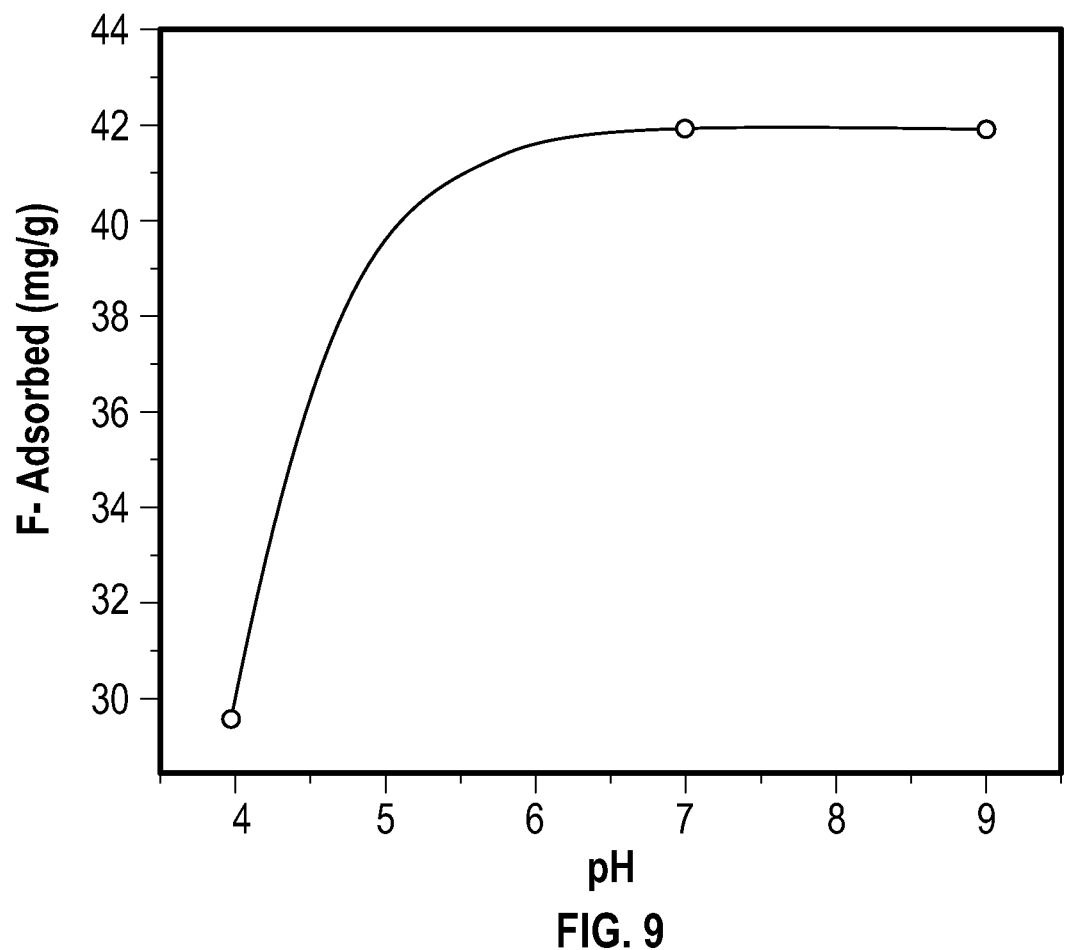
FIG. 9 is a graph depicting the adsorption capacity of the Al—NOCNF composite of the present disclosure as a function of pH.

The maximum adsorption was shown to be 43.56 mg of fluoride per gram of Al—NOCNF, which compared very favorably with commercial materials. From the pH (see FIG. 9), Al—NOCNF was effective at removing fluoride from neutral and basic solutions of fluoride, but adsorption capacity decreased as the acidity of the fluoride solution increased. This was in agreement with the stability test. Using ICP-MS to measure concentration of aluminum, acidic environments led to the release of aluminum from the cellulose and reduction in fluoride adsorption capacity.

Figure 10:
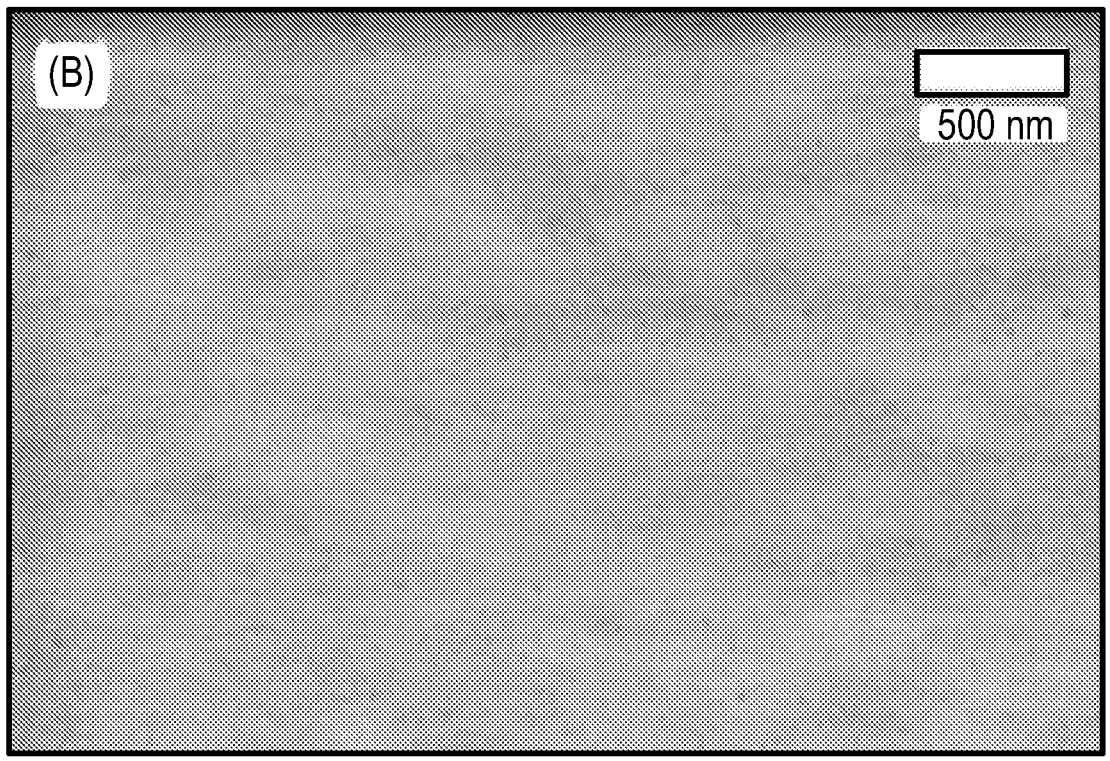
FIG. 10 is a scanning electron microscopy image of Fluoride captured aluminum loaded cellulose nanofibers (F@Al—NOCNF) of the present disclosure.
Figure 11:
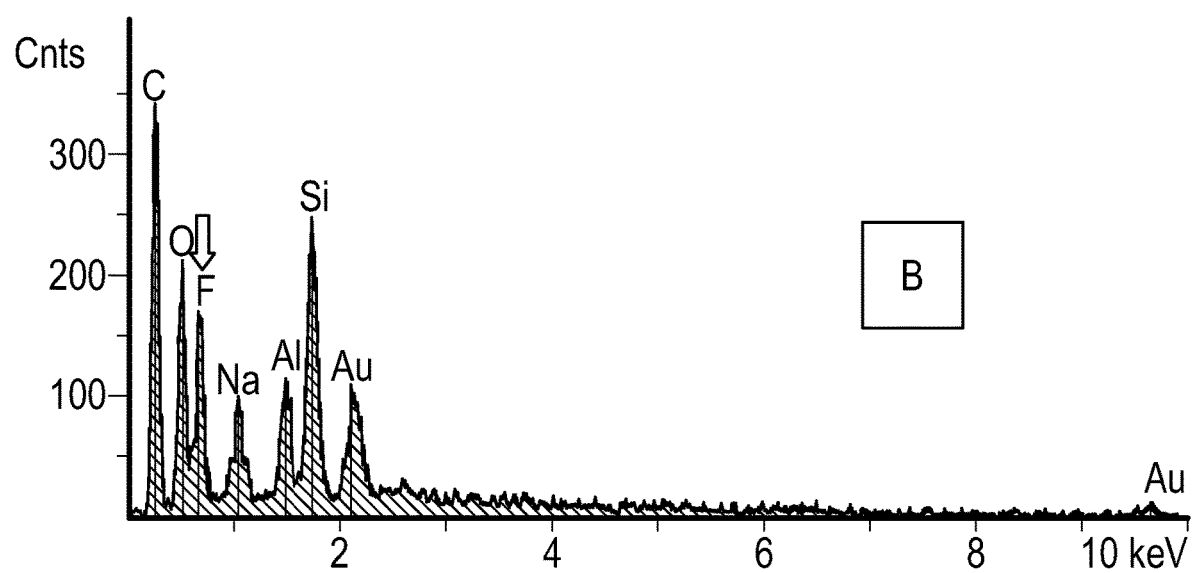
FIG. 11 is an Energy-dispersive X-ray spectroscopy (EDS) image of Fluoride captured aluminum loaded cellulose nanofibers (F@Al—NOCNF) of the present disclosure.

Images of the composite with the metal ions after contact with fluoride ions (F@Al—NOCNF) were obtained using scanning electron microscopy (SEM) and Energy-dispersive X-ray spectroscopy (EDS), with the images set forth as FIGS. 10 and 11, respectively. The EDS of F@Al—NOCNF showed the presence of fluoride in the sample after Al—NOCNF had been used to treat a fluoride sample.

Figure 12:
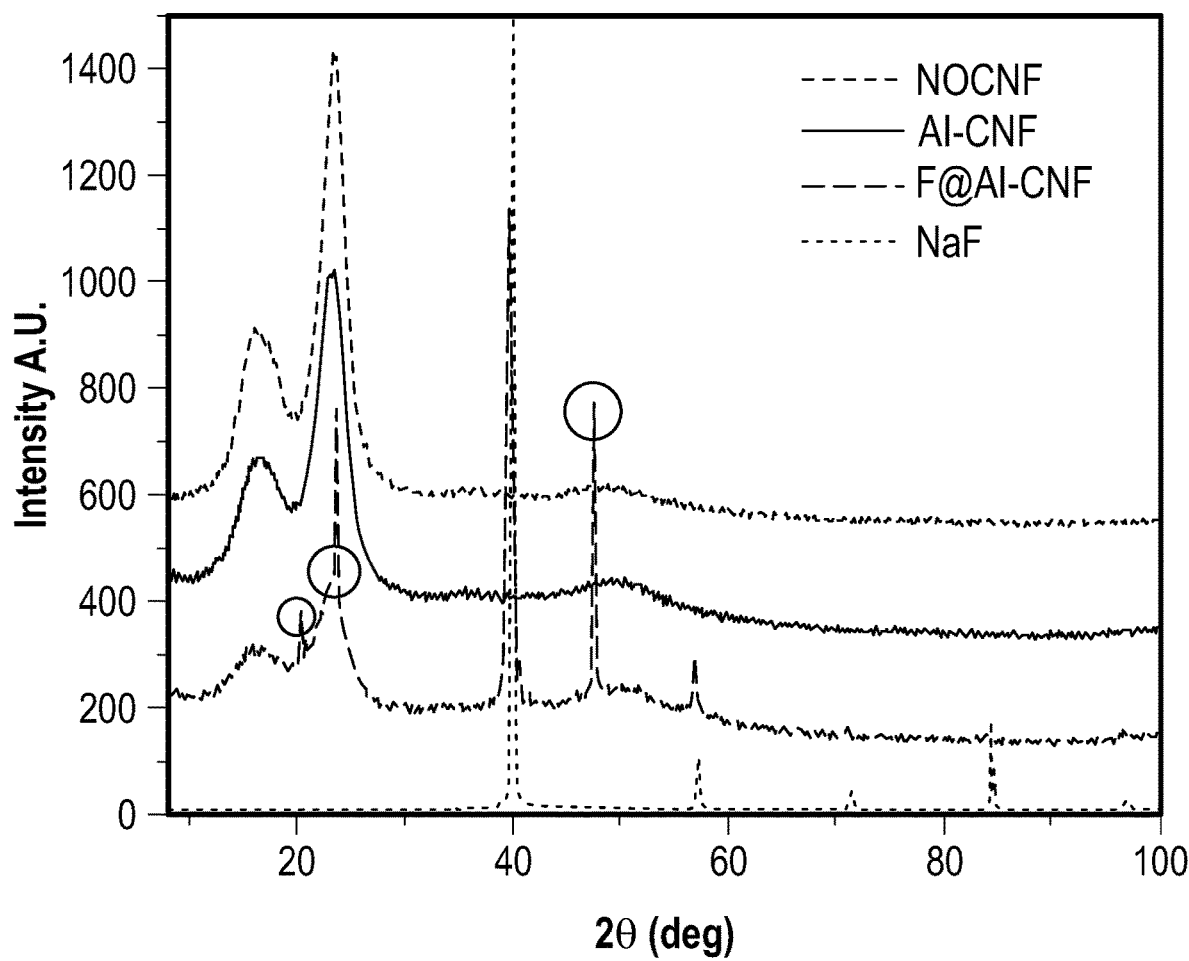
FIG. 12 is a graph depicting the wide angle X-ray diffraction (WAXD) patterns of cellulose nanofibers (NOCNF), aluminum loaded cellulose nanofibers (Al—NOCNF), and Fluoride captured aluminum loaded cellulose nanofibers (F@Al—NOCNF).

Wide angle X-ray diffraction (WAXD) of the cellulose nanofibers (NOCNF), aluminum loaded cellulose nanofibers (Al—NOCNF) and Fluoride captured aluminum loaded cellulose nanofibers (Al—NOCNF) were also obtained. A graph depicting the resulting WAXD patterns of these fibers is set forth in FIG. 12. The WAXD of NOCNF and Al—NOCNF were almost identical, indicating the aluminum crosslinked with the cellulose and did not crystalize into aluminum oxide/hydroxide species. New peaks in F@Al—NOCNF not otherwise seen in NaF were observed. While not wishing to be bound by any theory, this may be the result of crystallization of fluoride on the surface of the Al—NOCNF.

Advantages of the Compositions and Methods Include:
1. The interactions of strong metal ions (valence equal or larger than 2) and functionalized cellulose fibers generates stable composite scaffolds with strong positive surface charges.

2. Cellulose fibers in the scaffold include macroscale (1-100 micron) or nano-scale (1-1000 nm) fibers, having chemical structures including anhydroglucose units.
3. The primary and secondary hydroxyl groups in anhydroglucose units can be modified to negatively charged groups such as carboxylate groups (COO), using nitro-oxidation, TEMPO oxidation, per-iodate oxidation, perchlorite oxidation, carboxymethylation methods, etc.
4. Cellulose microfibers can be further converted into nanosize (L=>100 nm and D=<100 nm) during the modification steps as mentioned above or by the mechanical treatment (homogenization, microfluidization, ball milling, cryo-crushing, steam explosion, etc.) or by combined chemical/mechanical treatments.
5. The cellulose nanofibers in micro or nano form with or without negative charge can be treated with positively charged metal ions (valence equal or larger than 2) at room temperature. The interactions between the oxygen atom of hydroxyl and/or carboxylate groups on the cellulose chain and the positively charged metal ions generate a water stable scaffold, predominantly decorated with positively charged ions.
6. This positively charged scaffold can be utilized to remove negatively charged impurities $X^-$ (halogenated ions such as $F^-$), $NO_2^-$, $NO_3^-$, $PO_4^{2-}$, $SO_4^{2-}$, $CN^-$, $AsO_3^-$, phenoxide, combinations thereof, etc. from liquids, in embodiments water. Importantly, the scaffold includes cellulose and positively charged metal ions that are separated along with the negatively charged impurities after remediation, without having the problem of secondary contaminations.
7. The scaffold includes cellulose and metal ions that are used as adsorbent, absorbent, coagulant, flocculent and filtrate substrate.
8. The demonstrated aluminum-cellulose nanofiber composite (Al—NOCNF) was able to remove fluoride ions from water at a large range of fluoride concentrations.

The compositions and methods described herein use carboxycellulose nanofibers (NOCNF) from untreated (raw) jute biomass using a simple and cost-effective nitro-oxidation approach. The resulting NOCNF, having an average width of 4.6 nm and an average length of 1000 nm, possessed 0.42 mmol/g carboxylate content. These nanofibers were further modified into cationic substrate in the form of $Al^{+3}$ (Cellulose-$COO^-$)$_3$ scaffold, which remove negatively charged fluoride ions from water. The mechanism of removal involved stronger electrostatic interactions between $Al^{+3}$ and $F^-$ ions than $Al^{+3}$ and NOCNF. Interestingly, the $Al^{+3}$ (Cellulose-$COO^-$)$_3$ composite exhibited as high as ~148 and ~42 mg/g fluoride uptake efficiency at pH 4 and 7, respectively. Furthermore, NOCNF and $Al^{+3}$ (Cellulose-$COO^-$)$_3$ composite were characterized by NMR, WAXD, FTIR, SEM, TEM, BET, AFM, TGA, XPS, elemental analysis and ion chromatography (fluoride ion detection) techniques. Embodiments described herein provide a viable, economic and sustainable solution for removal of fluoride impurities from water, without risk of cross contaminations.

While the disclosure has been shown and described with reference to certain embodiments thereof, it will be understood by those skilled in the art that various changes in from and details may be made therein without departing from the spirit and scope of the present disclosure and equivalents thereof.

What is claimed is:
1. A method for removing negatively charged impurities from a liquid, comprising:
contacting the liquid containing a negatively charged impurity that is fluoride with a composite including:
carboxylated cellulose nanofibers; and
positively charged aluminum ions, wherein ionic interactions between the carboxylated cellulose nanofibers and the positively charged aluminum ions form the composite.
2. The method of claim 1, wherein the composite has a charge density from about 0.01 mmol/g to about 10 mmol/g.
3. The method of claim 1, wherein the ionic interactions occur between oxygen atoms of a hydroxyl group, a carboxylate group, or both, on the carboxylated cellulose nanofibers and the positively charged aluminum ions.
4. The method of claim 1, wherein the composite is a gel.
5. The method of claim 1, wherein the carboxylated cellulose nanofibers are obtained from a plant biomass.
6. The method of claim 5, wherein the plant biomass includes lignocellulose wood, non-lignocellulose wood, lignocellulose, pure cellulose, grasses, phytoplanktons, algal celluloses, tunicate celluloses, and combinations thereof.
7. The method of claim 5, wherein the plant biomass is obtained from non-wood sources selected from jute, bamboo, cotton, banana rachis, wheat straw, barley, hemp, flax straw, coconut fiber, soy hull, pea hull fiber, rice husk, sugarcane bagasse, pineapple leaf rachis, sisal fiber, tunicates, black spruce, *eucalyptus*, valonia, bacterial celluloses, *spinifex*, and combinations thereof.
8. The method of claim 1, wherein the liquid is water.
9. The method of claim 1, wherein the liquid further includes at least one additional negatively charged impurity.
10. A method for removing negatively charged impurities from a liquid, comprising:
contacting the liquid containing a negatively charged impurity that is fluoride with a composite including:
carboxylated cellulose nanofibers; and
positively charged aluminum ions, wherein ionic interactions between oxygen atoms of at least one of a hydroxyl group or a carboxylate group of the carboxylated cellulose and the positively charged aluminum ions form the composite.
11. The method of claim 10, wherein the composite has a charge density from about 0.01 mmol/g to about 10 mmol/g.
12. The method of claim 10, wherein the composite is a gel.
13. The method of claim 10, wherein the cellulose nanofibers are obtained from a plant biomass selected from lignocellulose wood, non-lignocellulose wood, lignocellulose, pure cellulose, grasses, phytoplanktons, algal celluloses, tunicate celluloses, and combinations thereof.
14. The method of claim 10, wherein the cellulose nanofibers are obtained from a plant biomass obtained from non-wood sources selected from jute, bamboo, cotton, banana rachis, wheat straw, barley, hemp, flax straw, coconut fiber, soy hull, pea hull fiber, rice husk, sugarcane bagasse, pineapple leaf rachis, sisal fiber, tunicates, black spruce, *eucalyptus*, valonia, bacterial celluloses, *spinifex*, and combinations thereof.
15. The method of claim 10, wherein the liquid is water.
16. The method of claim 10, wherein the liquid further contains at least one additional negatively charged impurity.
17. The method of claim 9, wherein the at least one additional negatively charged impurity includes at least one of $NO_2^-$, $NO_3^-$, $PO_4^{2-}$, $SO_4^{2-}$, $CN^-$, $AsO_3^-$, or phenoxide.

18. The method of claim 16, wherein the at least one additional negatively charged impurity includes at least one of $NO_2^-$, $NO_3^-$, $PO_4^{2-}$, $SO_4^{2-}$, $CN^-$, $AsO_3^-$, or phenoxide.

* * * * *